United States Patent [19]

Pratt, Jr.

[11] Patent Number: 4,478,484
[45] Date of Patent: Oct. 23, 1984

[54] RESILIENT OPTICAL CONNECTOR BETWEEN A LIGHT CONDUCTOR AND AN IONIZATION BULB

[75] Inventor: John W. Pratt, Jr., Kettering, Ohio

[73] Assignee: Monarch Marking Systems, Inc., Dayton, Ohio

[21] Appl. No.: 328,891

[22] Filed: Dec. 9, 1981

[51] Int. Cl.³ .............................. G02B 5/14; G02B 7/26
[52] U.S. Cl. .................................. 350/96.20; 250/227; 250/557; 250/571; 313/110; 362/32; 362/260; 362/263; 362/264
[58] Field of Search ........ 250/227, 548, 557, 566–569, 250/571; 350/96.20; 313/110; 362/32, 217, 223, 260, 263, 264

[56] References Cited

U.S. PATENT DOCUMENTS

| | | | |
|---|---|---|---|
| 2,093,735 | 9/1937 | Prouty | 362/263 |
| 3,584,779 | 6/1971 | Kessler | 250/227 |
| 4,233,493 | 11/1980 | Nath | 362/32 |
| 4,241,978 | 12/1980 | Dubois et al. | 350/96.2 |
| 4,311,359 | 1/1982 | Keller | 350/96.2 |

Primary Examiner—John D. Lee
Assistant Examiner—Brian M. Healy
Attorney, Agent, or Firm—Joseph J. Grass

[57] ABSTRACT

There is disclosed an optical system for reading light-activatable marks on a record medium. The system includes a coupling for connecting a light bulb and a light conductor which allows for relative movement between the light bulb and the light conductor while maintaining light transmitting contact therebetween.

7 Claims, 3 Drawing Figures

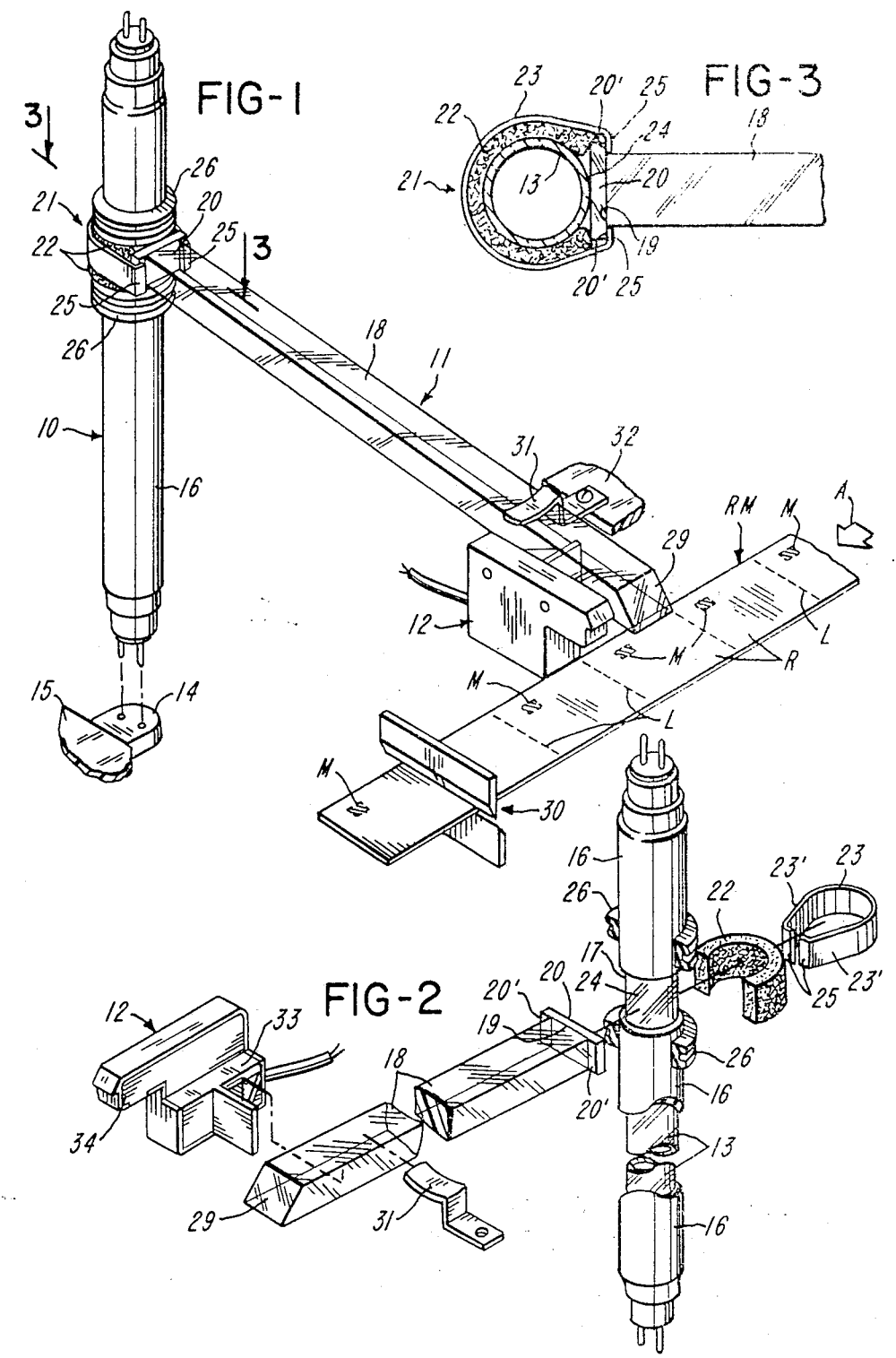

RESILIENT OPTICAL CONNECTOR BETWEEN A LIGHT CONDUCTOR AND AN IONIZATION BULB

BACKGROUND OF THE INVENTION

Field of the Invention

This invention relates to the field of optical systems.

SUMMARY OF THE INVENTION

A specific purpose of the invention is to provide a simple, reliable, low-cost optical system for reading light-activatable marks on a record medium. According to the invention, light is brought from a light bulb to a remote location via a light conductor. The light bulb and the light conductor are coupled in such a way that light from the bulb is efficiently transmitted to the light conductor and through the light conductor to a remote location. If the light bulb and light conductor were rigidly attached to each other, there would be a greater likelihood of breaking the bulb if either the light conductor or the bulb is bumped or otherwise moved during assembly, use or servicing of the system. If there is any movement between parts of the frame of the system, of if the light rod is displaced during servicing, any rigid connection between the light bulb and the light conductor could be broken. Also, replacement of the light bulb could be difficult. According to a specific embodiment of the invention, there is provided an optical system having a light bulb, a light conductor for conducting light from the bulb to a remote location, and means defining a movable connection between the light bulb and the light conductor. The movable connection enables the light conductor and the bulb to move or float relative to each other while still maintaining the light transmitting relation from the bulb to the light conductor. The connection is yieldable so it constantly urges the light bulb and the light conductor into light transmitting cooperation. The light conductor conducts light to record medium to activate light-activatable marks on the record medium. An activated mark can thereafter be sensed by a sensor to control a machine function such as a record severing function.

Other features of the invention disclosed in this application will be readily apparent to those skilled in the art.

BRIEF DESCRIPTION OF THE DRAWINGS

FIG. 1 is a perspective view showing an optical system in accordance with the invention;

FIG. 2 is a partly exploded perspective view of the optical system of FIG. 1; and FIG. 3 is a sectional view taken generally along line 3—3 of FIG. 1.

DETAILED DESCRIPTION OF THE PREFERRED EMBODIMENT

With reference to the drawings, there is shown a light bulb generally indicated at 10, a light conductor generally indicated at 11, and an optical sensor generally indicated at 12. The light bulb 10 is preferably of the ionization type as shown. The bulb 10 is shown to include an elongated tube 13. The ends of the tube 13 are connected to conventional electrical connectors 14 (only one of which is shown) mounted on a frame part 15. The outer surface of the tube 13 is covered, as by a coating of opaque material 16. As shown, a considerable portion of the outer surface of the tube 13 is covered by the opaque material 16 leaving only a small clear annular portion 17. The light conductor 11 is shown to comprise a one-piece light rod 18 having a straight end 19 and a straight filter 20 suitably adhered as by adhesive to the end 20. The filter 20 is shown in FIGS. 1 and 3 to be in direct contact with the portion 17. The light bulb 10 and the light conductor 11 are coupled by a connection generally indicated at 21. The connection 21 is shown to include a resilient cushion or pad 22 and a clip 23. The pad 22 is wrapped partially about the portion 17 to expose only a small section 24 of the portion 17. The section 24 is the window through which light can be emitted to the filter 20. Thus, the pad 22 masks off a considerable amount of the surface of the portion 17. The clip 23 is shown to be U-shaped in construction and to have opposed flanges or fingers 25 that engage shoulders 20' provided by end portions of the filter 20. The clip 23 is configured so that when the pad 22 and the clip 23 are in the position shown in FIGS. 1 and 3, the pad 22 is slightly compressed and the light conductor 11, and specifically the filter 20, is urged into contact with the section 24 of the bulb 10.

It will be apparent to one skilled in the art that alternatively the tube 13 itself could have a filter (not shown) formed directly on its surface 24 with the light rod 18 bearing directly against that filter. In such event the light rod can have notches (not shown) for receiving flanges 25 of the clip 23.

In order to keep the pad 22 from shifting relative to the elongated tube 13, elastomeric stops 26 are provided on both ends of the pad 22. The inside diameter of the stops 26 before assembly onto the tube 13 is slightly less than the outside diameter of the opaque material 16 on the tube 13. The stops 26 can be manually slid into the portion shown on the opaque material 16 but, once positioned, keep the pad 22 from shifting. The stops 26 straddle the filter 20 and prevent the filter 20 and light rod 18 to which the filter 20 is attached from shifting.

The straight end 19 is perpendicular to the axis of the rod 18. The filter 20 is flat against the end 19. This construction is conducive to efficient transmission of light from the bulb 10 into the light rod 18. However, other configurations of the filter 20 and end 19 of the light rod 18 can be used. When the light passing through the rod 18 encounters the end surface 29, it is deflected onto the record medium RM, comprised of a web of records R partially severed by longitudinally spaced lines L of partial severing. The records R contain longitudinally spaced light-activatable marks M. The record medium RM moves in the direction of arrow A, and the marks M move successively into the path of light from the light rod 18. The marks M are invisible to the naked eye but when actuated as by ultraviolet light, they can be sensed by sensing head 34 of the sensor 12 which is disposed in the path of the marks M. The sensor 12 controls any desirable machine function, for example, a knife mechanism 30 for severing records R from the record medium RM.

A clip 31 secured to a frame part 32 resiliently bears against the light rod 18 and urges the light rod 18 against a T-shaped upper surface 33 of the light sensor 12. As shown, the light rod 18 is in close proximity to sensing head 34. The sensor 12 can be mounted to a frame part 32. It sometimes happens that the light bulb 10 needs to be changed in which event arms 23' of the clip 23 are spread apart and the flanges 25 can be moved away from shoulders 20'. The pad 22 can thereupon be moved apart from the bulb 10. If desired, the stops 26' can be removed and reused with a new bulb 10. The pad 22 and the clip 23 can be easily applied to the new bulb.

The connection 21 between the light bulb 10 and the light conductor 11 keeps the light conductor in contact with the bulb 10 during use but enables the light bulb 10 and the light conductor 11 to be shifted to some extent relative to each other while in contact. The light conductor 11 can also be adjusted relative to the sensor 12 which maintains such contact between the light bulb 10 and the conductor 11. Because of the movable or floating relation the connection 21 makes between the bulb 10 and the light conductor 11, some movement of the frame parts 15 and 32 relative to each other can take place without degrading the transmission of light from the bulb 10 to the light rod 18. Moreover, such relative movement of bulb 10 and the light rod 18 will not damage the bulb 10 or the filter 20.

Although the bulb 10 is of the ultra-violet light type and the filter 20 filters out rays other than ultraviolet emitted by the bulb 10, other types of bulbs and filters corresponding to the nature of the marks M can be used.

Other embodiments and modifications of the invention will suggest themselves to those skilled in the art, and all such of these as come within the spirit of this invention are included within its scope as best defined by the appended claims.

I claim:

1. An optical system including a light bulb, a light conductor for conducting light from the bulb to a remote location, means for holding the light conductor against the bulb, and wherein the holding means includes a resilient pad extending partially about the bulb and a member in gripping relation with the light conductor and urging the resilient pad to hold the conductor and the bulb in light transmitting relationship.

2. An optical system as defined in claim 1, wherein the resilient pad is U-shaped and the member includes a U-shaped clip wrapped about the pad, wherein the light conductor has a pair of shoulders, the clip having opposed ends providing flanges engaged with the shoulders, the resilient pad being under slight compression to urge the light conductor against the light bulb.

3. An optical system, comprising: a light bulb including an elongate ionization tube and a light conductor for conducting light from the tube to a remote location, the light conductor having an end portion, the light conductor being positioned generally laterally with respect to a side of the tube, the end portion of the light conductor being positioned against and in contact with the outside of the tube, and resilient means extending at least partially about the ionization tube and including a connector for removably holding the ionization tube and the light conductor resiliently in contact with each other.

4. An optical system as defined in either claim 1 or claim 3, wherein the light bulb comprises an elongate ionization tube having an opaque portion and a light transmitting portion through which light is transmitted to the light conductor.

5. An optical system as defined in either claim 1 or claim 3, wherein the light conductor includes a one-piece light rod and a straight filter between the light rod and the bulb, wherein the light rod has a straight end in contact with the straight filter.

6. An optical system as defined in claim 3, wherein the holding means includes a resilient pad between the tube and connector.

7. An optical system, comprising: a light bulb including an elongate ionization tube having an opaque portion and a light transmitting portion, the opaque portion being substantially larger than the light transmitting portion, a light conductor extending generally laterally with respect to a side of the tube and having an end portion positioned in light receiving relationship with respect to the light transmitting portion, and resilient means extending at least partially about the ionization tube and including a connector for removably holding the light transmitting portion of the ionization tube and the light conductor resiliently in contact with each other.

* * * * *